United States Patent [19]

Kitagawa et al.

[11] Patent Number: 4,525,702

[45] Date of Patent: Jun. 25, 1985

[54] FLEXIBLE TYING MEMBER FOR THEFTPROOF DEVICE

[76] Inventors: Tadao Kitagawa, No. 4-7, Minamidai 2-chome, Kamifukuoka-shi, Saitama-ken, Japan, 356; Yutaka Kosuge, No. 23-3-19-604, Sayamadai 3-chome, Sayama-shi, Saitama-ken, Japan, 350-13; Yoichiro Noda, No. 3308, Kubota, Otsukacho, Miyazaki-shi, Miyazaki-ken, Japan, 880

[21] Appl. No.: 425,325

[22] Filed: Sep. 28, 1982

[30] Foreign Application Priority Data

Oct. 9, 1981 [JP] Japan ................. 56-161844
Nov. 17, 1981 [JP] Japan ................. 56-184285
Nov. 17, 1981 [JP] Japan ................. 56-184286

[51] Int. Cl.³ ............. G08B 29/00; B62H 5/00; G02B 5/14
[52] U.S. Cl. .................... 340/556; 340/557; 340/571; 350/96.23
[58] Field of Search ............ 340/555, 556, 557, 571; 350/96.23

[56] References Cited

U.S. PATENT DOCUMENTS

| | | | |
|---|---|---|---|
| 3,714,644 | 1/1973 | Hellstrom | 340/556 |
| 3,781,861 | 12/1973 | Adler, Jr. | 340/571 |
| 3,824,540 | 7/1974 | Smith | 340/571 |
| 3,866,205 | 2/1975 | Payne et al. | 340/571 |
| 4,141,622 | 2/1979 | Beal | 350/96.23 |
| 4,341,440 | 7/1982 | Trezequet et al. | 350/96.23 |
| 4,450,434 | 5/1984 | Nielsen et al. | 340/555 |

FOREIGN PATENT DOCUMENTS 8006483 6/1982 Netherlands ............ 340/571

*Primary Examiner*—Howard A. Birmiel
*Attorney, Agent, or Firm*—Arthur L. Lessler

[57] ABSTRACT

A flexible tying member for a theftproof device which is adapted to give warning in response to a change in a photo signal transmitted in an optical fiber extending through the flexible tying member. The flexible tying member has a coaxial structure comprising a central layer including one of the optical fiber and at least one electric wire, an intermediate layer including the other of these two members, and an outer wall layer including a reinforcing member.

9 Claims, 12 Drawing Figures

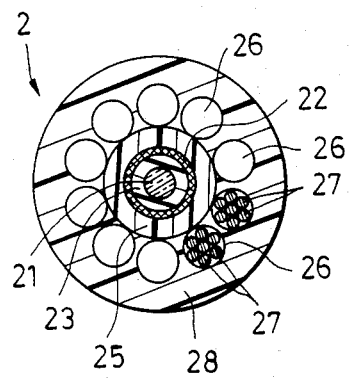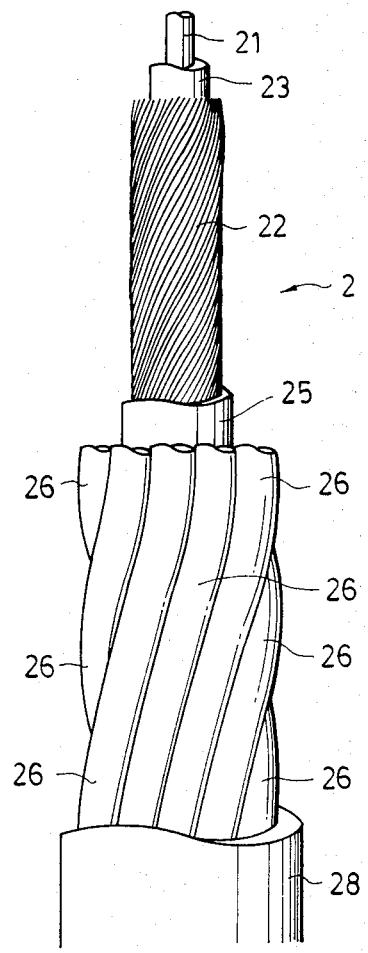

FIG. 10
FIG. 11
FIG. 12
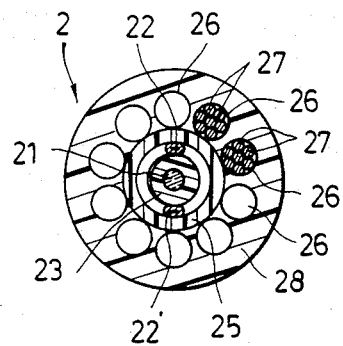
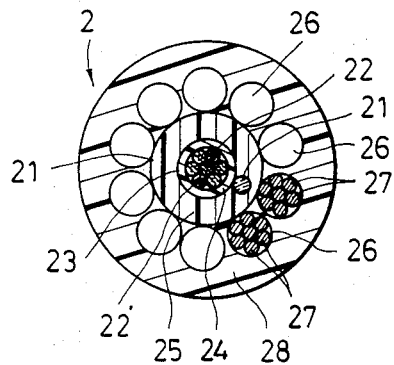
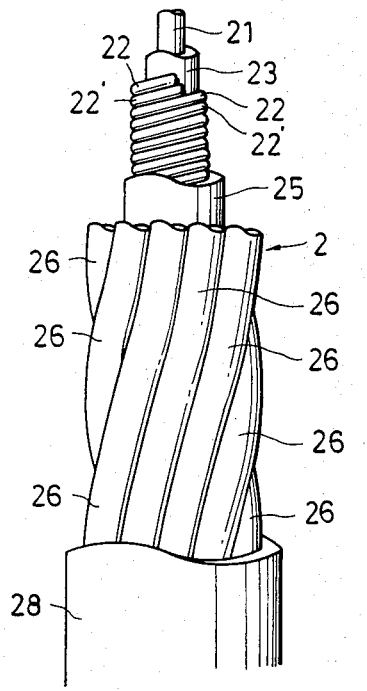

FLEXIBLE TYING MEMBER FOR THEFTPROOF DEVICE

BACKGROUND OF THE INVENTION

This invention relates to a theftproof device, and more particularly to a flexible tying member forming part of a theftproof device and through which an optical fiber extends.

A theftproof device for vehicles such as motorcycles has been proposed by the assignee of the present application, which uses a flexible tying member such as a wire cable, through which an optical fiber extends. The proposed theftproof device is used in such a manner that a vehicle, which is to be protected from theft, is tied to a solid structure such an electric pole, by means of the above flexible tying member, while a photo signal is permanently transmitted through the optical fiber. When the flexible tying member is cut in two to cause interruption of the transmission of the photo signal through the optical fiber, the cutting of the flexible tying member is detected in a photoelectric manner to actuate a warning device to give warning Such flexible typing member with an optical fiber incorporated therein should desirably have such a structure as to fully protect the optical fiber from damage, and also should have sufficient strength so as to withstand frequent use. Further, it should have a moderately small diameter to facilitate its handling, particularly in a limited housing space for a vehicle to be protected from theft. In addition, for normal operation of the theftproof device, the optical fiber should be disposed in the flexible tying member in such a manner as to keep the transmission loss of light through the optical fiber at a small value, as well as to obtain sufficient transmission efficiency of light through the optical fiber.

OBJECTS AND SUMMARY OF THE INVENTION

It is an object of the invention to provide a flexible tying member for theftproof devices, which is adapted to fully protect an optical fiber extending therethrough from damage so as to withstand long-term use.

It is a further object of the invention to provide a flexible tying member for theftproof devices, which has a moderately small diameter as well as sufficient strength, for facilitation of handling, particularly in a small housing space for a vehicle to be protected from theft.

It is another object of the invention to provide a flexible tying member for a theftproof device, in which an optical fiber is disposed such that its light transmission loss is small and its light transmission efficiency is high enough for the theftproof device to perform its proper function.

A theftproof device, to which the present invention is applicable, comprises an elongate flexible tying member, an optical fiber longitudinally extending through the flexible tying member, a pair of photoelectric elements arranged at opposite ends of the optical fiber, and means responsive to a change in an electric signal generated by one of the photoelectric elements, which corresponds to a change in a photo signal generated by the other photoelectric element and transmitted in the optical fiber, for performing a warning function. The elongate flexible tying member has a three-layer coaxial structure comprising a first layer including one of the optical fiber and at least one electric wire longitudinally extending through the tying member and electrically connected to at least one of the above photoelectric elements, a second layer concentrically disposed around the first layer and including the other of the optical fiber and the at least one electric wire, and a third layer concentrically disposed around the second layer and including a reinforcing member longitudinally extending through the tying member.

The above and other objects, features and advantages of the invention will be more apparent from the ensuing detailed description taken in connection with the accompanying drawings.

BRIEF DESCRIPTION OF THE DRAWINGS

FIG. 4 is mounted;

FIG. 8 is a cross-sectional view illustrating the flexible tying member according to a further embodiment of the invention;

FIG. 9 is a fragmentary side and broken view illustrating the flexible tying member of FIG. 8;

Figure 1:
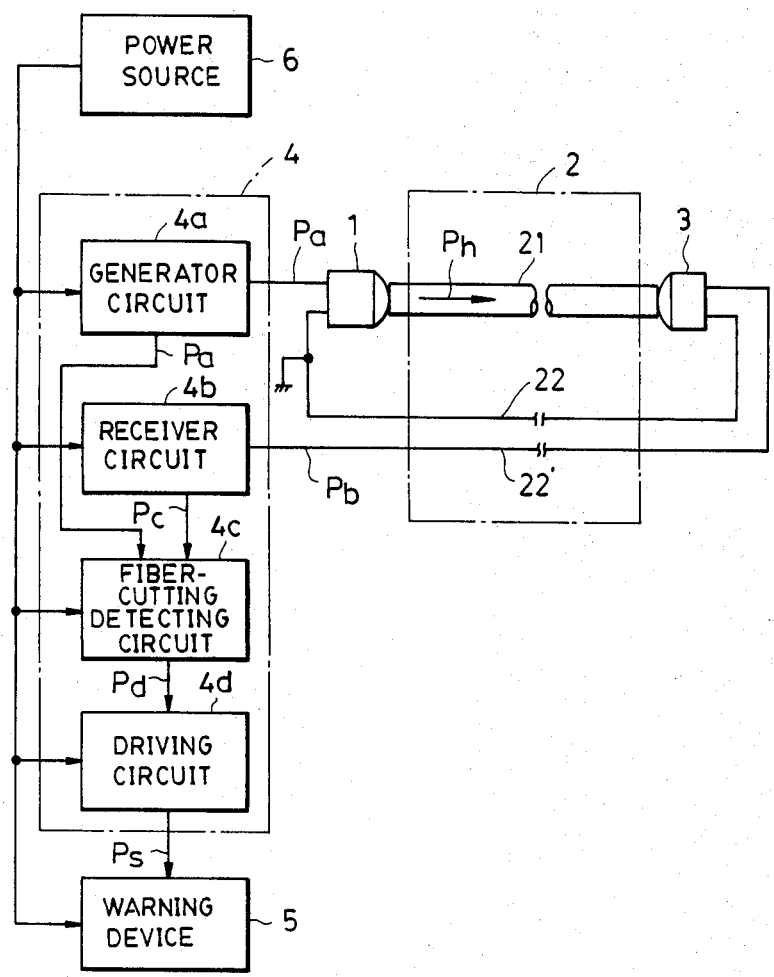
FIG. 1 is a block diagram showing an example of an electrical circuit for use in a theftproof device to which the flexible tying member according to the present invention is applicable.

10. FIG. is a cross-sectional view illustrating the flexible tying member according to a still further embodiment of the invention;

FIG. 11 is a fragmentary side and broken view illustrating the flexible tying member of FIG. 10; and FIG. 12 is a cross-sectional view illustrating the flexible tying member according to another embodiment of the invention.

DETAILED DESCRIPTION

The flexible tying member according to the present invention will now be described in detail with reference to the drawings which illustrate several embodiments thereof. In the drawings, like reference characters designate like or corresponding parts throughout all the views.

Referring first to FIG. 1, there is illustrated an electrical circuit, by way of example, for use in a theftproof device to which the flexible tying member of the present invention is applicable. In FIG. 1, reference numeral 1 designates a light emission element 1 as a photoelectric element, such as a light emission diode, which is arranged at one end of an optical fiber 21 extending through a flexible tying member 2 which is preferably formed of a wire cable, as hereinlater described in detail. A light receiving element 3 as another photoelectric element, such as a phototransistor, is arranged at the other end of the optical fiber 21. The light emission element 1 and the light receiving element 3 are electrically connected to an electrical circuit 4. The electrical circuit 4 is adapted to supply an electric signal to the light emission element 1 and generate a warning signal in cooperation with a warning device 5 connected to the output of the former, in response to an output of the light receiving element 3. A power source 6 is connected to the electrical circuit 4 and the warning device 5 to supply them with electric power. In the illustrated example, the light receiving element 3 and the electrical circuit 4 are connectect together by way of lead wires 22 and 22' which are windingly disposed in the flexible tying member 2 of the invention, as hereinlater described.

The electrical circuit 4 comprises a generator circuit 4a, a receiver circuit 4b, a fiber-cutting detecting circuit 4c, and a driving circuit 4d. The generator circuit 3a can be formed by a pulse generator, which is adapted to generate an electric pulse signal Pa having a predetermined constant pulse repetition period. The light emission element 1, which is adapted to convert an electric signal into a corresponding photo signal, is operable in response to the pulse signal Pa to generate a corresponding photo pulse signal Ph. This photo pulse signal Ph is transmitted through the optical fiber 21. The light receiving element 3, which is adapted to convert a photo signal into a corresponding electric signal, is operable in response to the photo pulse signal Ph inputed thereto through the optical fiber 21 to generate a corresponding electric pulse signal Pb. The receiver circuit 4b is arranged to receive and detect the signal Pb supplied thereto from the light receiving element 3 to generate a corresponding electric pulse signal Pc. The fiber-cutting detecting circuit 4c is arranged to be supplied with the pulse signal Pa and Pc, respectively, from the generator circuit 4a and the receiver circuit 4b for detection of disconnection or cutting of the optical fiber 21, depending upon the input signals. For instance, it can be adapted to determine fulfillment of an "AND" condition of the levels of the signals Pa and Pc to generate an abnormality-indicative signal Pd when it determines that the AND condition is not fulfilled. The driving circuit 4d, which is adapted and arranged to actuate the warning device 5, is responsive to the input signal Pd to generate a driving signal Ps. The warning device 5, which can be formed of a buzzer, is responsive to the input driving signal Ps to give an alarm.

Figure 2:
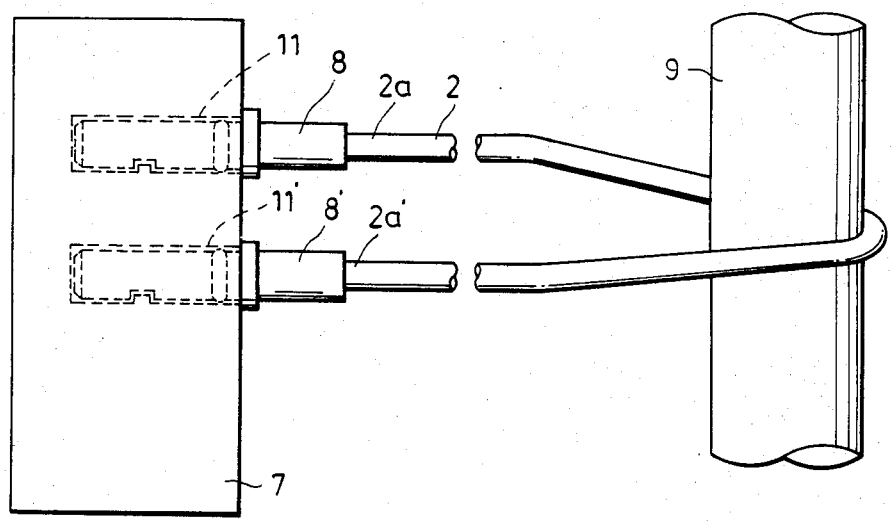
FIG. 2 is a schematic view illustrating a manner of using a theftproof device to which the flexible tying member of the present invention is applicable.
Figure 5:
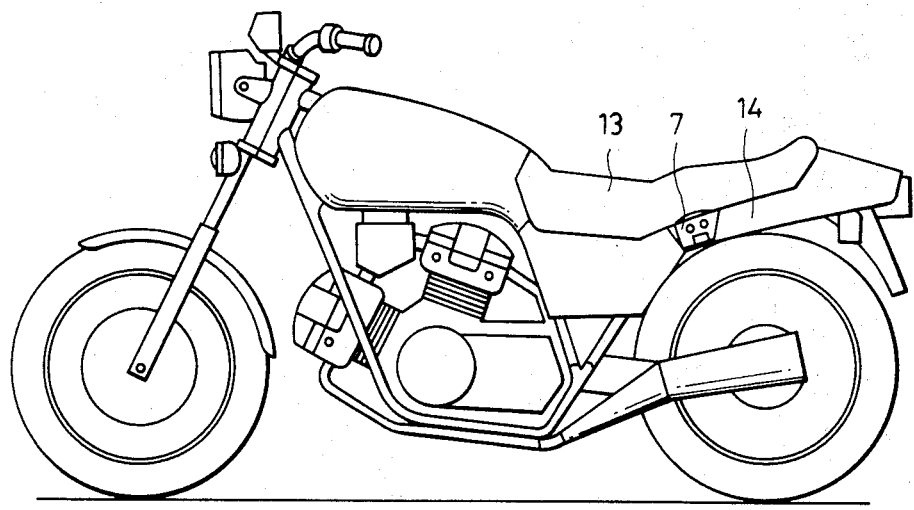
FIG. 5 is a schematic side view of a motorcycle on which the main body of the theftproof device appearing in FIG. 2

FIG. 2 schematically illustrates a theftproof device to which the flexible tying member, the electrical circuit, etc. in FIG. 1 are applied. The theftproof device has casing 7 in which accommodated the electrical circuit 4, the warning device 5 and the power source 6, all appearing in FIG. 1. The casing 7 is rigidly mounted on a vehicle, e.g. on a motorcycle, as shown in FIG. 5, at a predetermined location, for instance, at a side wall of a rear cowl 14 under a seat 13.

The flexible tying member 2 has its opposite ends 2a and 2a' provided with connection plugs 8 and 8', made of a metal material, fitted and rigidly secured thereon. The plug 8 accommodates the light emission element 1 in FIG. 1 for instance, and the other plug 8' the light receiving element 3 in FIG. 1, for instance, respectively. The connection plugs 8 and 8', and the casing 7 are provided with respective engaging means, not shown, which are adapted to lock the plugs 8 and 8' in the casing 7, once the plugs have been fully inserted into locking holes 11 and 11' formed in a front wall of the casing 7, in a manner that the plugs cannot be removed from the holes 11 and 11' without using a key, not shown, for unlocking them.

The casing 7 is provided with connectors, not shown, arranged in the locking holes 11 and 11' for locking engagement with connectors, not shown, provided within the connection plugs 8 and 8', so that when the plugs 8 and 8' have been fully inserted into the locking holes 11 and 11' of the casing 7, the light emission element 1 and the light receiving element 3 are automatically electrically connected with the electrical circuit 4 in FIG. 1, by way of these engaging connectors.

To use the theftproof device constructed above, the flexible tying member 2 is wound around a solid structure 9, such as an electric pole appearing in FIG. 2, and then the plugs 8 and 8' are inserted into their respective locking holes 11 and 11' and locked therein. Thus, the flexible tying member 1 is looped as a whole to firmly tie a vehicle or the like to be protected from theft to the structure 9.

In this state, the vehicle or the like cannot be easily removed from the structure 9 by any other method than unlocking the plugs 8 and 8' form the locking holes 11 and 11' by the use of a key, except by cutting the flexible tying member 2 in two by means of a wire cutting tool or the like. When there occurs cutting of the tying member 2, the warning device 5 is operative to give warning, as previously stated. The electrical circuit 4 may be arranged such that the fiber-cutting detecting circuit 4c is operative to cause the warning device 5 to give warning, upon detecting cutting of at least one of the optical fiber 21 and the lead wires 22 and 22' which are disposed through the flexible tying member.

Figure 3:
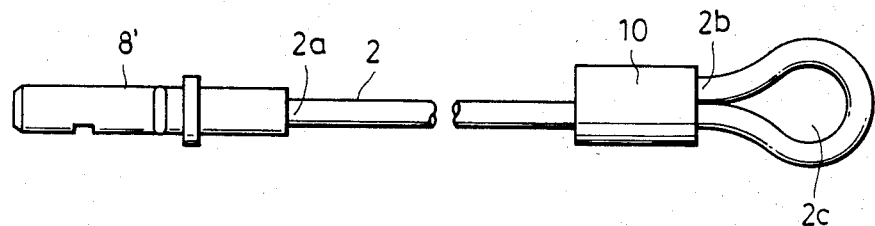
FIG. 3 is a schematic view illustrating a modification of the flexible tying member.
Figure 4:
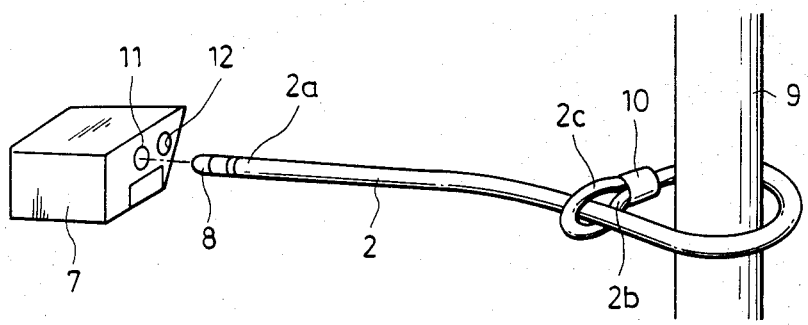
FIG. 4 is a schematic view illustrating a manner of using the flexible tying member of FIG. 3.

FIG. 3 illustrates another flexible tying member having a different configuration from that of the flexible tying member appearing in FIG. 2. The flexible tying member 2 carries at its one end 2a a plug 8 secured thereon, which is similar to the one appearing in FIG. 2, and in which are accommodated the light emission element 1 in FIG. 1 and a connector, neither of which is shown in FIG. 3. The flexible tying member 2 also carries at its other end 2b a caulking metal holder 10 rigidly secured on the same end in a caulked manner. The metal holder 10 accommodates a capsule, not shown, in which the light receiving element 3 is supportedly disposed in alignment with an associated end of the optical fiber 21. The end 2b of the flexible tying member 2 and the capsule are held together by the metal holder 10, in a manner forming a loop 2c. A manner of tying a vehicle to an electric pole or the like by means of the flexible tying member of FIG. 3, is shown in FIG. 4, that is, the flexible tying member 2 is wound round the electric pole 9 or the like, then the plug 8 is passed through the loop 2a, and then the same plug is locked into a locking hole 11 formed in the casing 7. In FIG. 4, reference numeral 12 designates a lock for preventing disengagement of the plug 8 from the locking hole 11.

Details of the flexible tying member 2 according to the invention, which is used in the above manner, will now be described with reference to FIGS. 6 through 12. In the following embodiments, the flexible tying member 2 is formed of a wire cable as a most preferable material, and is, therefore, hereinafter called "the lock wire cable".

Figure 6:
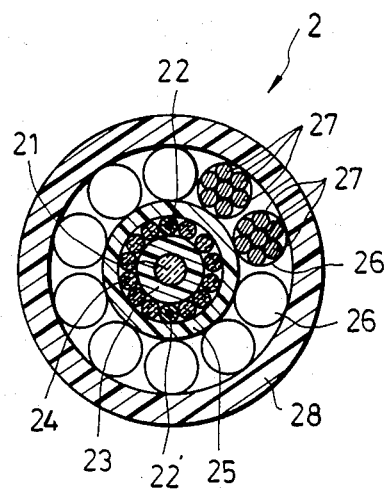
FIG. 6 is a cross-sectional view of the flexible tying member according to an embodiment of the present invention.
Figure 7:
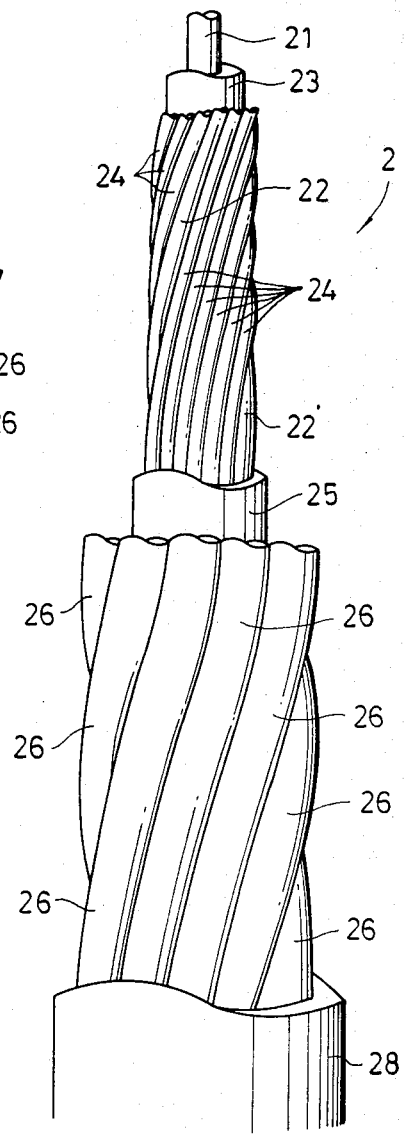
FIG. 7 is a fragmentary side and broken view illustrating the flexible tying member of FIG. 6.

Referring first to FIGS. 6 and 7, a first embodiment of the lock wire cable is illustrated. The optical fiber 21 is arranged at the diametric center of the lock wire cable and longitudinally extends along the axis of the lock wire cable. The optical fiber 21 is covered with a protective layer 23 formed of a synthetic resin such as polyvinyl cholride and polyethylene, forming a first layer in cooperation with the latter. Two lead wires or electric conductors 22 and 22' are concentrically disposed or wound around the outer peripheral surface of the protective layer 23, together with a plurality of, e.g. twelve, auxiliary cords 24 having almost the same diameter as the former, in a manner longitudinally extending parallel with each other. In the illustrated embodiment, the two lead wires 22 and 22' are diametrically symmetrically arranged. These lead wires 22 and 22' and the auxiliary cords 24 are covered with a protective layer 25 formed of a synthetic resin similar to that of the layer 23, forming a second layer together with the latter. Concentricaly disposed or wound around the protective layer 25 are a plurality of, e.g. ten, strands 26, each formed of a plurality of, e.g. seven, twisted steel wires 27, which longitudinally extends parallel with each other, to serve as a reinforcing member. The strands 26 are covered with another protective layer 28 formed of a synthetic resin such as polyvinyl chloride, as an outer wall member, forming a third layer together with the latter.

As noted above, the optical fiber 21 is arranged at the diametric center of the wire cable and extends along the axis of the latter in a streamline manner. Therefore, it does not have any unnecessary curved portion and can accordingly transmit light or a photo pulse signal Ph through a minimum distance from an end to the opposite end. In other words, the total length of the optical fiber can be short to keep the transmission loss of light transmitted therethrough at a very small value. Also, having no torsional or curved portion, the optical fiber can have sufficient light transmission efficiency, i.e. a large light transmission amount per unit length.

Further, since the optical fiber 21 is enclosed by the protective layers 23, 25 and 28, the strands 26, etc., it is fully protected from being damaged by external disturbances, and accordingly has a long life.

Moreover, the lock wire cable 2 has a coaxial arrangement of the optical fiber 21, the lead wires 22, 22', the auxiliary cords 24, and the strands 26, which can not only reduce the outer diameter of the lock wire cable 2 to a moderate value, but also impart sufficient strength to the wire cable 2, facilitating handling of same and preventing easy cutting of same.

The auxiliary cords 24 are used as dummy cords, and can be formed of a material cheaper than that of the lead wires 22 and 22', for instance, twisted threads of a natural fiber or a chemical or synthetic fiber. In addition, the use of the dummy cords 24 can make the winding angle of the lead wires 22 and 22' smaller with respect to the axis of the lock wire cable 2 to reduce the whole length of the lead wires 22 and 22' to be used, resulting in a reduction in the manufacturing cost of the lock wire cable 2. The auxiliary cords 24 need not be in the form of cords, but may be formed by any flexible filamentous members if they have required strength. For instance, they may be each formed by a single flexible filamentous material made of a synthetic resin.

The lead wires 22 and 22' are not limited in number to two as in the illustrated embodiment, but only a single such lead wire may be used, and in such a case, the strands 26 may be arranged to conduct electric current therein, for use as one of the electric conductors.

The numbers of the strands 26 and the twisted steel wires 27 are not limitative, but may be selected at any desired or required numbers, depending upon the required outer diameter, strength, etc. of the lock wire cable 2.

FIGS. 8 and 9 illustrate a second embodiment of the lock wire cable of the invention. In a manner similar to the first embodiment, the optical fiber 21 is arranged at the diametric center of the lock wire cable, 2 which longitudinally extends along the axis of the later, and is covered with a protective layer 23 formed of a similar synthetic resin to the one in the first embodiment, forming a first layer together. Wound around the protective layer 23 are a multiplicity of bare copper wires which longitudinally extend parallel with each other, to serve as a lead 22. The bare copper wires 22 are covered with a protective layer 25, forming a second layer together. In a manner similar to the first embodiment, a plurality of, e.g. ten, strands 26, each formed of a plurality of, e.g. seven, twisted steel wires 27, are wound around the protective layer 25. The strands 26 are covered with a further protective layer 28 as an outer wall member, formed of a synthetic resin similr to that of the first embodiment, which fills gaps between the individual strands 26, forming a third layer together. In this embodiment, the strands 26 are arranged to conduct electric current therein to serve as the other lead 22', as well as a reinforcing member.

According to the second embodiment of FIGS. 8 and 9, in addition to similar results to those obtained by the first embodiment of FIGS. 6 and 7, that is, low light transmission loss and high light transmission efficiency of the optical fiber 21, sufficient protection of the optical fiber, and small diameter and sufficient strength of the lock wire cable 2, an additional excellent result is available that the use of the strands 26, for one of the leads 22 and 22', only one lead wire 22 formed by parallel-twisted copper wires suffices, which can reduce the outer diameter of the lock wire cable 2.

FIGS. 10 and 11 illustrate a third embodiment of the lock wire cable of the invention. In a manner similar to the preceding embodiments, the optical fiber 21 is arranged at the diametric center of the lock wire cable 2, longitudinally extends along the axis of the latter, and is covered with a protective layer 23 formed of a similar synthetic resin to the ones in the preceding embodiments, forming a first layer together. The protective layer 23 is covered with two lead wires 22 and 22', which are each coated with an insulating material such as a synthetic resin. These lead wires 22 and 22' are lapped around the protective layer 23 with a small pitch and in a parallel manner, and covered with a protective layer 25 similar to the ones in the preceding embodiments, forming a second layer together. In a manner similar to the second embodiment of FIGS. 8 and 9, a plurality of, e.g. ten strands 26, each formed of a plurality, e.g. seven, twisted steel wires 27 are wound around the protective layer 25, which are in turn covered with an outer wall-forming protective layer 28, similar to the ones in the preceding embodiments, filling gaps between the individual strands 26, forming a third layer together.

According to the third embodiment of FIGS. 10 and 11, in addition to results similar to those mentioned with respect to the preceding embodiments, ends of the lead wires 22 and 22' can be easily taken out from the respective ends of the lock wire cable 2, to facilitate wiring operation for electrical connection of the ends of the lead wires with associated connectors.

Further, as also mentioned with respect to the first embodiment, to lead wires 22 and 22' are not limited in mumber to two as illustrated. For instance, only a single such lead wire may be used, and at the same time, the strands 26 may be used as one of the electric conductors.

Although in all the above described embodiments, the optical fiber 21 is arranged at the diametric center of the lock wire cable 2 as a first layer, the lead wires 22 and 22', etc. may alternatively be arranged at the diametric center of the cable, as a first layer, with the optical fiber 2 arranged at the outer peripery of the first layer, as a second layer. FIG. 12 illustrates an example of such arrangement. Arranged at the diametric center of the lock wire cable 2 are two lead wires 22 and 22' and five auxiliary cords 24, as dummy cords, which are twisted together. The lead wires and dummy cords are covered with a protective synthetic resin layer 23, forming a first layer together. Arranged at the outer peripheral surface of the protective layer 23 is the optical fiber 21 which longitudinally extends but is wound thereon with a large pitch, and covered with a synthetic resin layer 25, forming a second layer together. Further, in a manner similar to the second and third embodiments, ten strands 26, each formed of seven twisted steel wires 27, are wound around the second layer, and covered with a synthetic resin layer 28, forming a third layer together.

Even this arrangement can provide excellent results similar to those mentioned with respect to the preceding embodiments, particularly sufficient protection of the optical fiber, and small outer diameter and sufficient strength of the lock wire cable.

What is claimed is:

1. In a theftproof device including an elongate flexible tying member, an optical fiber longitudinally extending through said flexible tying member, a pair of photoelectric elements arranged at opposite ends of said optical fiber, and means responsive to a change in an electrical signal generated by one of said photoelectric elements, which corresponds to a change in a photo signal generated by the other of said photoelectric elements and transmitted in said optical fiber, for performing a warning function, the improvement wherein said elongate flexible tying member comprises a first layer including one of said optical fiber and at least one electric wire which longitudinally extends through said flexible tying member and is electrically connected to at least one of said photoelectric elements, a second layer concentrically disposed around said first layer and including the other of said optical fiber and said at least one electric wire, and a third layer concentrically disposed around said second layer and including at least one mechanically reinforcing member longitudinally extending through said flexible tying member.

2. The flexible tying member as claimed in Claim 1, wherein said first layer includes said optical fiber arranged at a diametric center of said flexible tying member and extending along an axis thereof, and said second layer includes said at least one electric wire and a plurality of filamentous members formed of a material different from that of said at least one electric wire.

3. The flexible tying member as claimed in Claim 2, wherein said at least one electric wire and said filamentous members are wound around said first layer and longitudinally extend parallel with each other.

4. The flexible tying member as claimed in Claim 2, wherein said first layer includes said optical fiber arranged at a diametric center of said flexible tying member and extending along an axis thereof, and said second layer includes a multiplicity of bare wires forming one of said at least one electric wire, said bare metal wires being wound around said first layer and extending parallel with each other.

5. The flexible tying member as claimed in Claim 4, wherein said reinforcing member is formed of an electrically conductive material and electrically connected to one of said photoelectric elements to serve as another one of said at least one electric wire.

6. The flexible tying member as claimed in Claim 1, wherein said first layer includes said optical fiber arranged at a diametric center of said flexible tying member and extending along an axis thereof, and said second layer includes said at least one electric wire lapped around said first layer.

7. The flexible tying member as claimed in Claim 6, including two electric wires forming said at least one electric wire, said two electric wires each being coated with an insulting material, and lapped around said first layer in a parallel manner.

8. The flexible tying member as claimed in any one of Claims 1, 2, 3, 4, 5, 6 or 7, wherein said reinforcing member comprises a plurality of strands, each formed of a plurality of twisted steel wires.

9. The flexible tying member as claimed in any one of Claims 1, 2, 3, 4, 5, 6 or 7, wherein said first, second and third layers each have an outer peripheral portion thereof formed by a synthetic resin material.

* * * * *

UNITED STATES PATENT AND TRADEMARK OFFICE
CERTIFICATE OF CORRECTION

PATENT NO.  : 4,525,702
DATED       : June 25, 1985
INVENTOR(S) : Tadao Kitagawa, Yutaka Kosuge, Yoichiro Noda It is certified that error appears in the above-identified patent and that said Letters Patent is hereby corrected as shown below:

Column 8, line 20 after "bare" insert --metal--.

Signed and Sealed this

Twenty-sixth Day of November 1985

[SEAL]

Attest:

DONALD J. QUIGG

Attesting Officer

Commissioner of Patents and Trademarks